April 8, 1969  M. F. WAGNER  3,437,738
MODULAR TYPE ELECTRICAL OUTLET
Filed Nov. 17, 1967
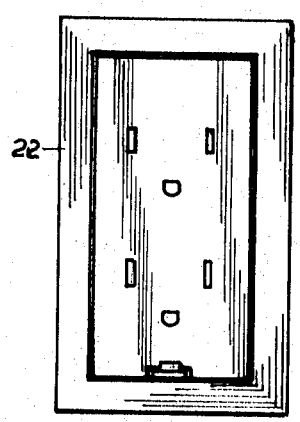
Fig. 1
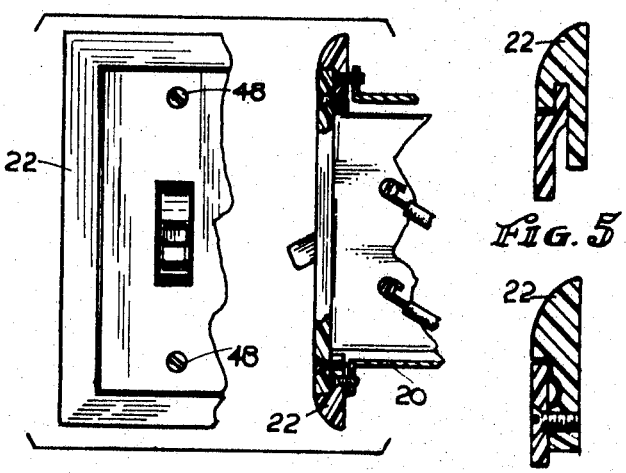
Fig. 2
Fig. 5
Fig. 6
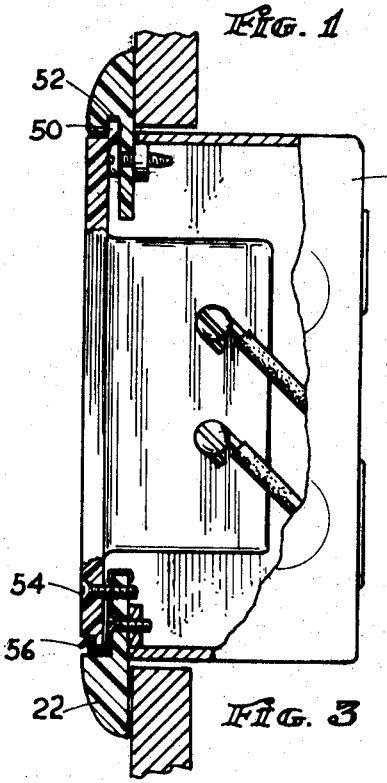
Fig. 3
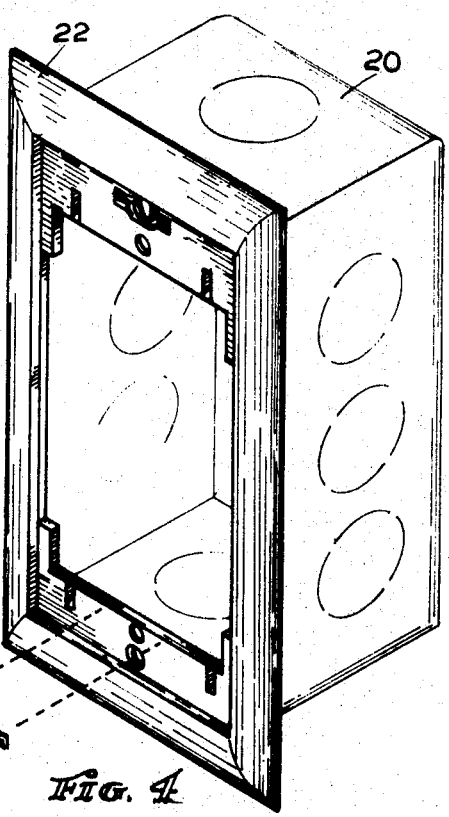
Fig. 4
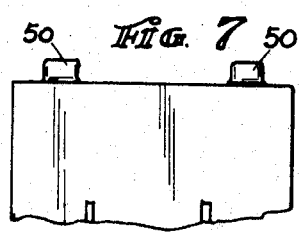
Fig. 7
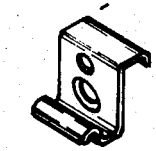
Fig. 8
INVENTOR.
MILAN F. WAGNER
BY LIONEL V. TEFFT
Attorney April 8, 1969  M. F. WAGNER  3,437,738
MODULAR TYPE ELECTRICAL OUTLET
Filed Nov. 17, 1967  Sheet 2 of 2
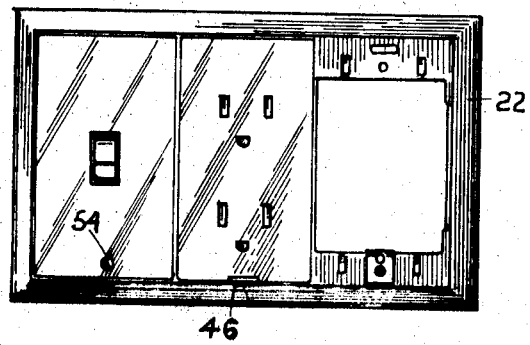
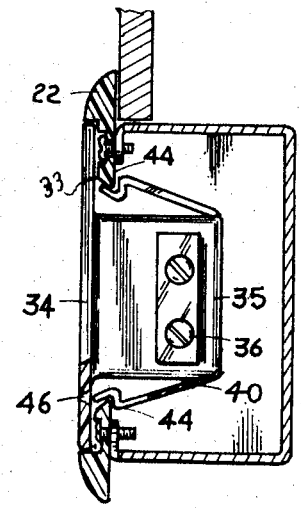
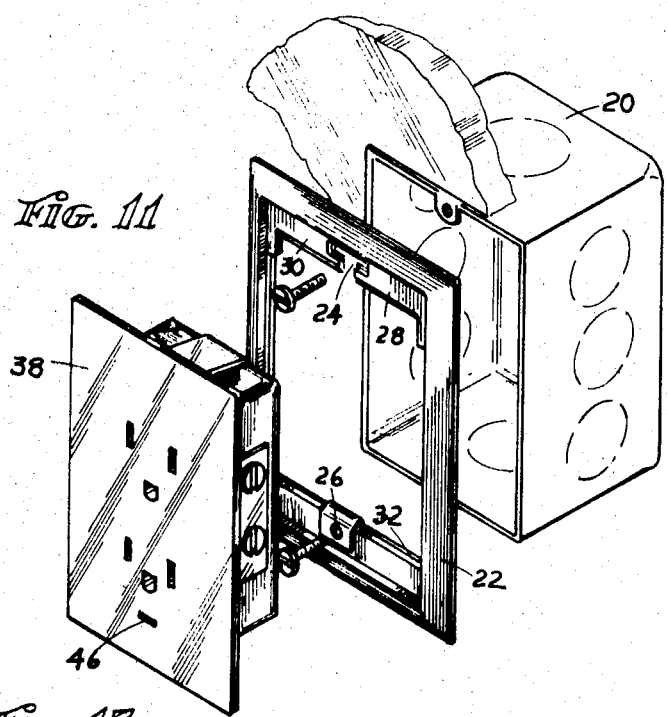
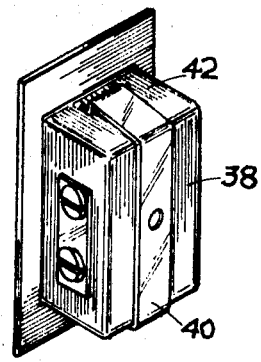
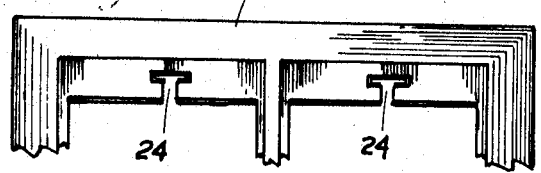
INVENTOR.
MILAN F. WAGNER
BY LIONEL V. TEFFT
Attorney

United States Patent Office 3,437,738
Patented Apr. 8, 1969

3,437,738
MODULAR TYPE ELECTRICAL OUTLET
Milan F. Wagner, 3248 Stoddard Ave.,
San Bernardino, Calif. 92405
Continuation-in-part of application Ser. No. 494,761, Oct. 11, 1965. This application Nov. 17, 1967, Ser. No. 683,926
Int. Cl. H01r *13/46;* H01h *9/02*
U.S. Cl. 174—55                                                    7 Claims

ABSTRACT OF THE DISCLOSURE

An apparatus in which a back plate is adjustably but fixedly attached to an outlet box, the plate being apertured and recessed in a manner to receive substantially flush therein a quick detachable modular electrical unit of any desired type.

---

This application is a continuation in part of my copending application Ser. No. 494,761, filed Oct. 11, 1965.

Careful searches and actions on the part of the patent office indicate adjustable attachment of the electrical module to the outlet box and finally securement of the back plate to the module. We may assume that this is conventional and a patent to Almcrantz, No. 1,933,358, October 1933, is to be considered. It will be noted that the electrician must always remove the back plate prior to repair or change of the electrical module.

The fundamental theory of the present invention is to change installation and replacement of electrical units by merely inserting them, irrespective of type in the specially formed back plate. Great saving in time and effort and a simplification of parts results.

Although applicant shows three different ways of attaching the module to the back plate, the preferred embodiment is the snap under type.

One of the objects of the invention is to provide an electrical outlet in which the modular electrical unit of any type is quick detachably connected to a specially formed back plate adjustably, but fixedly attached to the outlet box.

Another object of the invention is in the provision of special snap-under module, which is instantly attached or removed.

These and other objects and advantages of the present invention will become apparent to those skilled in the art upon consideration of the following detailed description of the preferred embodiment thereof, reference being made to the accompanying drawings, herewith, wherein:

FIGURE 1 is a plan view of the flush type module in the plate;

FIGURE 2 is a schematic view of a modified form in which the module is screw connected to the back plate;

FIGURE 3 is an elevational view partially in section showing a modification in which the module is tucked under the back plate and screw connected and also clip retained thereto at the opposite side;

FIGURE 4 is a perspective view of FIGURE 3;

FIGURE 5 is an enlarged partial view of the module tuck under connection;

FIGURE 6 is an enlarged partial view of the module screw connection;

FIGURE 7 is another plan view of the tuck under ends;

FIGURE 8 is an enlarged view of the electrical clip necessary when a nonmetallic or plastic back plate is used;

FIGURE 9 is a plan view showing a multiple arrangement of the modular electrical units, replaceable as desired;

FIGURE 10 is an elevational view partially in section of the preferred snap under modular type;

FIGURE 11 is a schematic view of the elements of FIGURE 10;

FIGURE 12 is a perspective view per se of the snap under electrical module; and

FIGURE 13 is a plan view showing one form of adjustable connection of a multiple type back plate.

Referring specifically to the drawings in which four types of modular attachment are shown, it will be noted that the outlet box 20 and back plate 22 adjustably attached thereto at 24 and screw attached at the opposite side at 26 are disclosed several times. Description thereof will not be repeated. The back plate 22 is specially formed. In each case it is slightly recessed at 28 and has a pair of opposed ledges 30 and 32 which form the outlet box attachment portion. The back plate 22 will be changed to quick detachably to receive the modules of different form but the recess and ledges are always maintained.

One type of electrical module is shown in FIGURE 12 and others in FIGURES 1, 2 and 3. Generally they have a front or face plate 34 and the electrical unit 36. The face plate 34 may be switch type, plug in, or the like. It makes no difference. The plate lies flush in the recess in the back plate. Standard electrical connecting means is shown at 36.

The electrical module 38 shown in FIGURES 11 and 12 has an outer flexible band 40 with dual ends 42 that snap under the slanted edges 44 as shown in FIGURE 10. It will be noted that the connection is slightly rounded at the one end for easy release. The snap under module 38 has an aperture 46 which permits insertion of a pick or otherwise for instant release.

There are other ways of connecting the front plate 34 to the back plate but they are not preferred. In FIGURE 2 the electrical module is connected by dual screws 48 to the back plate 22. In FIGURE 3 projections 50 on the front plate tuck under the back plate at 52. The opposite end may be screw connected at 54 to the back plate or it may snap under the electrical clip at 56. In FIGURE 9 multiple or gang modules are shown and there connection to the back plate may be made in any of the ways heretofore described.

The modifications shown and described are not intended to complicate the invention or the advantages of its construction and use. Under any circumstances the electrical module of any type is easily inserted or detached from the specially formed back plate. It is true that it is easier and quicker to snap under the module and release it with a pick inserted through the front plate aperture. The module lies flush or substantially so in the back plate, which need never be removed. The adjustability of the back plate permits it to hang properly on the wall.

While I have described in considerable detail what I believe to be the preferred form of my invention, it will be understood by those skilled in the art that various changes may be made in the shape and arrangement of the several parts without departing from the broad scope of my invention as defined in the following claims.

I claim:
1. An electrical outlet unit, comprising:
   an outlet box;
   a back plate fixedly attached thereto, said back plate including:
      a modular unit frontal receiving back plate opening;
      a frontally insertable modular electrical unit having;
      a face plate and attached electrical unit lying on the back plate;
      and detachable connections between the front plate and the back plate.
2. A device as set forth in claim 1 in which the back plate is adjustably connected to the outlet box.

3. An electrical outlet unit comprising:
an outlet box;
a back plate fixedly attached thereto, said back plate including:
a modular unit receiving back plate opening having at least two recessed opposed ledges;
a modulator electrical unit having: a face plate and electrical unit attached thereto lying flush in the recessed back plate opening and on the ledges; and
detachable connections between the front plate and back plate ledges.

4. A device as set forth in claim 3 in which the back plate is adjustably connected to the outlet box.

5. A device as set forth in claim 3 in which the front plate is screw connected to said back plate.

6. A device as set forth in claim 3 in which the front plate is tucked under one edge of the back plate and screw attached at the other end to the back plate.

7. A device as set forth in claim 3 in which the front plate is tucked under one edge of the back plate opening and secured to the opposite side by a ground clip which surrounds one of the ledges and has a latch portion therein.

References Cited

UNITED STATES PATENTS 1,933,358  10/1933  Almcrantz _____ 174—57

LEWIS H. MYERS, *Primary Examiner.*

D. A. TONE, *Assistant Examiner.*

U.S. Cl. X.R.

174—66, 57